H. C. CLARK.
ROLLER BEARING.
APPLICATION FILED NOV. 22, 1913.

1,280,664.

Patented Oct. 8, 1918.

WITNESSES.
M. E. McKade

INVENTOR
Herbert C. Clark
Attorney

UNITED STATES PATENT OFFICE.

HERBERT C. CLARK, OF PRESTWICH, ENGLAND.

ROLLER-BEARING.

1,280,664. Specification of Letters Patent. Patented Oct. 8, 1918.

Application filed November 22, 1913. Serial No. 802,474.

*To all whom it may concern:*

Be it known that I, HERBERT CARTER CLARK, a British subject, residing at Prestwich, county of Lancaster, England, have invented certain new and useful Improvements in Roller-Bearings, of which the following is a specification.

This invention relates to self alining roller bearings as distinguished from ball bearings and is designed to provide roller bearings to which end thrust may be applied without causing the rollers to jam.

It consists essentially in forming the inner race with a curved groove around its periphery, into which the rollers are fitted, and with flanges at either side of this groove against which the ends of the rollers abut, to prevent displacement of the rollers relatively to said race when subjected to end thrust.

The invention will be fully described with reference to the accompanying drawings.

Figure 1:
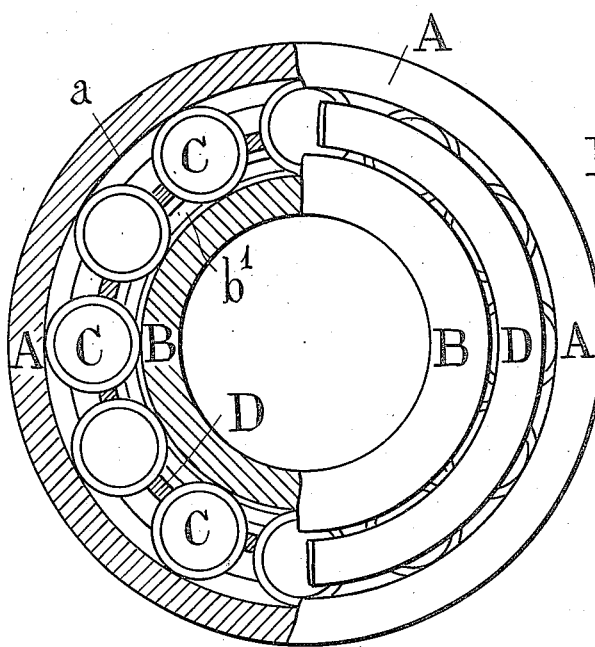

Figure 1 is a side elevation partly in section of a roller bearing made in accordance with my invention.

Figure 2:
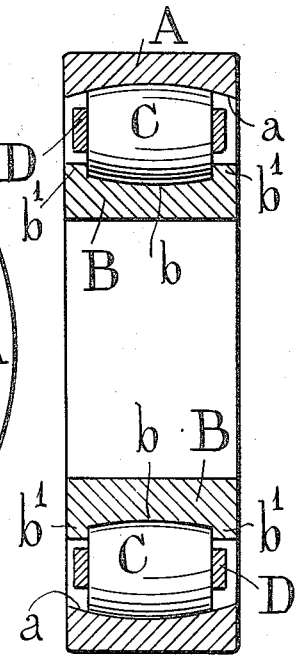

Fig. 2. is a transverse sectional view of same.

Figure 3:
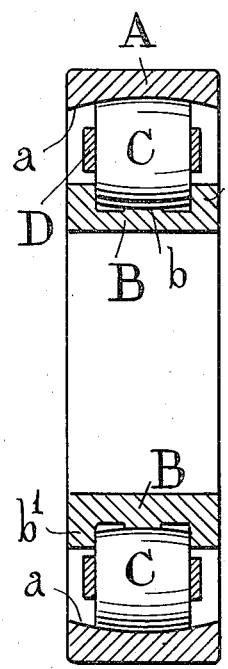

Fig. 3. is a transverse section showing a modified form of the inner race.

Figure 4:
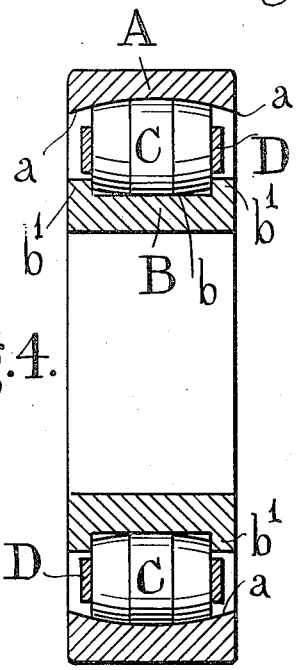

Fig. 4. is a transverse section showing a modified form of roller.

Figure 5:
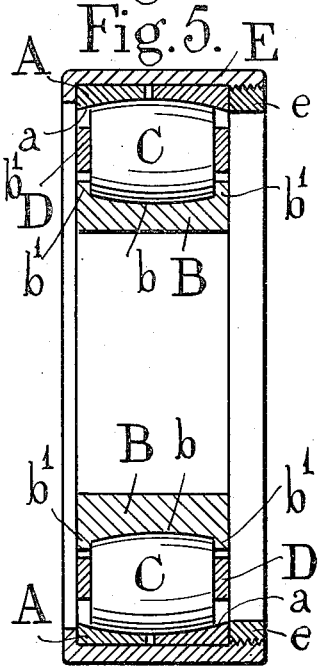

Fig. 5. is a transverse section showing an outer race adjustable to take up wear.

The outer roller race A is made with the inner surface $a$ of curved or spherical contour, and the inner roller race B is made with the outer surface $b$ of a concave groove, or curved in the reverse direction to that of the outer race A, and is formed with flanges $b'$ to prevent endwise movement and resist end thrust of the rollers. The rollers C are made of a similar curved shape on their periphery, or, in other words, are barrel shaped, so as to fit between the two curved races A and B, and are of a length to fit between the flanges $b'$.

This formation will allow of a swiveling or tilting movement of the inner race B and rollers C relative to the outer race A.

The rollers B are formed with a plane or even surface and held in position relatively to one another by a cage D, endwise movement of the rollers in the inner race being prevented by the flanges $b'$.

The rollers need not be curved for the whole of their length but may be partly flat as in Fig. 4, the surface $b$ of the inner race B, being correspondingly shaped or the surface $b$ of the inner race may have a plurality of grooves cut in it, as shown in Fig. 3.

To take up or compensate for wear, the outer race A may be made in two parts, as in Fig. 5. The parts may be secured together by a flanged casing E with a ring nut $e$ screwed into it at one side as in Fig. 5.

For bearings of greater width, two or more sets of rollers may be employed between the side flanges set end to end and separated by flanges.

What I claim as my invention and desire to protect by Letters Patent is:—

A self-alining roller bearing comprising an outer race composed of two complemental sections adjustable relative to each other and having a concave inner surface, an inner race having its outer surface formed with a continuous peripheral groove, a plurality of barrel shaped rollers interposed between said races and fitted in said grooves, a member for retaining the sections of the outer race in relative positions, and means carried by the retaining member for adjustment of said sections.

In testimony whereof I have hereunto set my hand in presence of two subscribing witnesses.

HERBERT C. CLARK.

Witnesses:
J. OWDEN O'BRIEN,
GEO. H. O'BRIEN.